D. Stukey,
Harvester Cutter.
No. 107,118.   Patented Sep. 6, 1870.
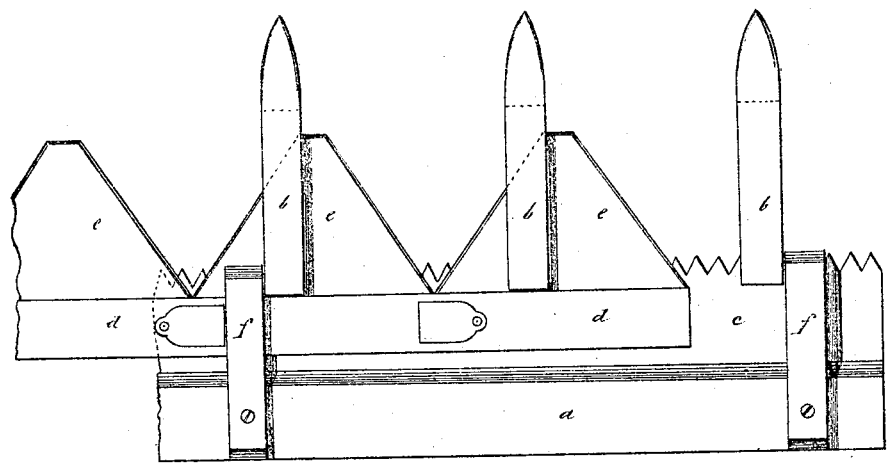
Daniel Stukey, Inventor.
Witnesses.
His Attorneys.

UNITED STATES PATENT OFFICE.

DANIEL STUKEY, OF LANCASTER, OHIO.

IMPROVEMENT IN HARVESTER-CUTTERS.

Specification forming part of Letters Patent No. 107,118, dated September 6, 1870.

*To all whom it may concern:*

Be it known that I, DANIEL STUKEY, of Lancaster, in the county of Fairfield and State of Ohio, have invented a new and useful Improvement in Harvesters; and I do hereby declare the following to be a full, clear, and exact description of the same, reference being had to the accompanying drawing, making a part of this specification, in which the figure is a plan view of the finger-bar, saw-blade, and knife-bar, with the latter drawn endwise so far as to partially expose the saw-blade.

This invention consists in the arrangement of the saw-blade in relation to the reciprocating knives, in such a manner that the teeth of the saw-blade project forward of the points at which the inclined sides of the knives meet, so far as to prevent stalks of grass or grain from collecting in the corners between the knives, and choking or clogging the same.

In the drawing, $a$ is the finger-bar; $b$, the fingers of the same; $c$, the saw-blade, which is laid flat on the fingers; $d$, the knife-bar, which is laid upon the saw-blade; $e$, the knives, and $f$ the guides in which the knife-bar plays.

As shown in the drawing, the saw-blade is wider than the knife-bar, and the teeth of the saw-blade project forward of the angles between the knives $e$. This arrangement prevents the stalks of the crop which is cutting from lodging in the said angles, and thus choking or clogging the knives.

The saw-blade may be fastened permanently, or slipped in and held by pieces of leather or other material, bearing against any two of the fingers $b$, in such manner that it may be easily removed.

Having thus described my invention, what I claim as new, and desire to secure by Letters Patent, is—

The stationary saw-blade $c$, arranged in relation to the reciprocating knives $e$, substantially as described.

DANIEL STUKEY.

Witnesses:
  A. T. BARNES,
  H. C. DRINKLE.